(12) United States Patent
Griessbaum et al.

(10) Patent No.: US 7,260,977 B2
(45) Date of Patent: Aug. 28, 2007

(54) SELF-DIAGNOSIS OF A VIBRATING LEVEL GAUGE

(75) Inventors: Karl Griessbaum, Muehlenbach (DE); Josef Fehrenbach, Haslach (DE); Martin Mellert, Steinach (DE)

(73) Assignee: Vega Grieshaber KG, Wolfach (DE)

( * ) Notice: Subject to any disclaimer, the term of this patent is extended or adjusted under 35 U.S.C. 154(b) by 147 days.

(21) Appl. No.: 11/193,950

(22) Filed: Jul. 29, 2005

(65) Prior Publication Data
US 2006/0053863 A1 Mar. 16, 2006

Related U.S. Application Data

(60) Provisional application No. 60/598,193, filed on Aug. 2, 2004.

(51) Int. Cl.
*G01F 25/00* (2006.01)
*G01F 23/28* (2006.01)
(52) U.S. Cl. .................................. 73/1.73; 73/290 V
(58) Field of Classification Search .............. 73/290 V, 73/1.73; 324/520, 521, 527
See application file for complete search history.

(56) References Cited

U.S. PATENT DOCUMENTS

| | | | |
|---|---|---|---|
| 4,594,584 A | 6/1986 | Pfeiffer et al. | |
| 5,191,316 A * | 3/1993 | Dreyer | 340/621 |
| 5,743,134 A | 4/1998 | Dreyer | |
| 6,138,507 A * | 10/2000 | Getman et al. | 73/290 V |
| 6,148,665 A * | 11/2000 | Getman et al. | 73/290 V |
| 6,628,123 B2 | 9/2003 | Raffalt et al. | |
| 6,769,804 B2 * | 8/2004 | Kawakatsu | 374/118 |
| 6,851,313 B2 | 2/2005 | Fehrenbach | |

FOREIGN PATENT DOCUMENTS

| | | |
|---|---|---|
| DE | 33 48 119 C2 | 10/1983 |
| DE | 42 32 719 A1 | 9/1992 |
| DE | 42 32 720 C1 | 9/1992 |
| DE | 44 02 234 C1 | 1/1994 |
| DE | 198 40 796 C1 | 9/1998 |
| DE | 100 23 305 A1 | 5/2000 |
| DE | 102 03 461 A1 | 1/2002 |

* cited by examiner

*Primary Examiner*—Hezron Williams
*Assistant Examiner*—John Fitzgerald
(74) *Attorney, Agent, or Firm*—Fay Kaplun & Marcin, LLP

(57) ABSTRACT

Described is a method for detecting and/or for monitoring the level of a medium stored in a vessel and in particular to a method for diagnosing the functionality of the electromechanical oscillation unit of a vibration level gauge. An electromechanical transducer of the electromechanical oscillation unit of a vibration level gauge is supplied with an electric wave signal. The frequency of which is beyond the resonance frequency range of the electromechanical oscillation unit and is thus not adapted to actuate the oscillatory portion as for example an oscillating rod probe or tuning fork, so that the electric wave signal is converted into mechanical oscillations without actuating the oscillatory portion. Subsequently, the converted mechanical oscillations will be recorded using the at least one electromechanical transducer of the electromechanical oscillation unit, which reconverts the mechanical oscillations into an electric wave signal. These recorded electric wave signals will then be analyzed to derive therefrom any transmission characteristics of the electromechanical transducer by comparing at least one of the signal characteristics of the reconverted electric wave signal with typical signal characteristics determined before. Finally, a status information will be edited subject to the analysis of the transmission characteristics.

21 Claims, 4 Drawing Sheets

SELF-DIAGNOSIS OF A VIBRATING LEVEL GAUGE

PRIORITY CLAIM

Applicant hereby claims priority to U.S. Provisional Patent Application Ser. No. 60/598,193 filed on Aug. 2, 2004 "Self-Diagnosis of a Vibrating Level Gauge" The entire disclosure of this prior application, is considered as being part of the disclosure of the accompanying application and is hereby expressly incorporated by reference herein.

TECHNICAL FIELD OF THE INVENTION

The present invention relates to a method for detecting and/or for monitoring the level of a medium stored in a vessel. In particular, the present invention relates to a method for diagnosing the functionality of the electromechanical oscillation unit of a vibration level gauge. Furthermore, the invention is directed to a vibration level gauge which is adapted to carry out a self-diagnosis.

BACKGROUND OF THE INVENTION

Generally, for detecting the level of a material stored in a vessel vibrating gauges are employed which operate on the basis of oscillatory portions as for example coaxial tube oscillators or tuning forks. For detecting whether a predetermined switching level is reached or not, these systems analyze the attenuation and/or the frequency shift of the resonance frequency of the electromechanical oscillation system once the oscillating portion of the vibration level gauge immerses into the filling material.

For example, a vibration level gauge is known from DE 33 48 119 C2 which is adapted to detect a predetermined filling level and which comprises oscillatory portions as for example an oscillating rod probe or tuning fork protruding into a vessel and being excited by means of an electrical actuation unit. Since the rod probe or the tuning fork is part of a feedback circuit, the frequency of the rod probe or tuning fork depends on the filling level in the vessel. Hence, by amplifying, and due to the feedback of the electrically detected mechanical oscillation signal onto the actuation input, an oscillatory system comes into being which is generally know as an oscillator.

In contrast to said method, which uses an oscillatory mechanical portion as a part of an electromechanical oscillator, it is known from DE102 03 461 to detect a predetermined filling level by externally actuating an oscillatory system in its resonance frequency by means of an electric oscillator, measuring of at least one characteristic of the systems response on said actuation and analyzing these characteristics. However, this method is only adapted to detect a filling level if the system is operated in its resonance frequency or at least in a frequency band which is very close to said resonance frequency.

However, since a failure in the functionality of such a vibration level gauge may cause serious damages as, for example, overflowing of a vessel or dry running of a pump, it is known to supply such a vibrating level gauge with various internal testing options in order to detect a failure in the operation and to generate an appropriate notice of failure.

Therefore, it is known, for example, from DE 198 40 796 D1, to adjust the gain of a feedback amplifier for the purposes of a self-test whereby it is possible to enforce a notice that a predetermined filling level of a vessel is reached on a trial basis.

Another test method is disclosed in DE 100 23 305 A1, wherein the capacity or inductivity between the feed cables leading to a piezoelectric element is detected during the vibrational agitation. Once the detected value of the capacity or inductivity differs from a predetermined set point, a notice of failure occurs.

Finally, DE 44 02 234 describes to temporarily break the connection between an amplifier and an actuation transducer and to analyze system failures from a phase shift detected due to the break of the connection.

However, the above illustrated methods suffer from the disadvantage that the result of the self-test is either not totally independent from the filling level prevailing at the moment of the self-test or since not the whole actuation element required for the vibrational agitation is involved in the self-test. Therefore, the reliability of said self-diagnosis is limited. Moreover, the above illustrated methods are merely adapted to detect and signal a total failure of a gauge whereas failures in sub-assemblies of the gauge pass undetected. Furthermore, the results of these diagnosing processes are derived from only one physical characteristic of the gauge which is normally at the same time the measured quantity wherefrom a notice may be derived, that a predetermined filling level is reached.

SUMMARY OF THE INVENTION

Starting from the above illustrated deficiencies in connection with the above illustrated methods for diagnosing, it is an object of the present invention to provide a method for diagnosing which allows to reliably test a vibrating level gauge with respect to its functionality of at least its electromechanical oscillation unit. When a serious failure occurs, it is preferable that the level gauge edits a notice of failure and that the gauge in any case generates a certain diagnostic information which is illustrative for the status of the level gauge. In particular, said diagnostic information shall give a hint on how far the functionality of the level gauge has qualitatively removed itself from its ideality.

Therefore, according to a first aspect of the present invention a method for diagnosing the functionality of the electromechanical oscillation unit of a vibration level gauge is provided which supplies in a first step at least the electromechanical transducer of the electromechanical oscillation unit of a vibration level gauge with an electric wave signal, wherein the frequency of which is beyond the resonance frequency range of the electromechanical oscillation unit and is thus not adapted to actuate the oscillatory portion as for example an oscillating rod probe or tuning fork of the electromechanical oscillation unit, so that the electric wave signal is converted into mechanical oscillations without causing resonance of the oscillatory portion. In a second method step the converted mechanical oscillations will be recorded using the at least one electromechanical transducer of the electromechanical oscillation unit, which reconverts the mechanical oscillations into an electric wave signal. In a further method step these recorded electric wave signals will be analyzed to derive therefrom any transmission characteristics of the electromechanical transducer by comparing at least one of the signal characteristics of the reconverted electric wave signal with typical signal characteristics determined before. Finally, in a final method step a status information will be edited subject to the analysis of the transmission characteristics.

Since the inventive self-diagnosis is operated in at least one frequency which is beyond the resonance frequency range of the electromechanical oscillation unit of the level gauge, the present invention proves to be advantageous, since beyond the resonance frequency range of the electromechanical oscillation unit the impact of the oscillation probe or tuning fork and its environment becomes negligible, wherefore the dependency of the result of the self-diagnosis from the filling level of the monitored vessel can be substantially excluded. A further advantage compared to the known techniques is in that when the electromechanical transducer is designed in an ordinary manner from at least one actuating element as, for example, a piezoelectric element which is separated from another actuating element as, for example, another piezoelectric element, both electromechanical elements of which the electromechanical transducer may consist can be checked at the same time.

According to a further aspect of the present invention the at least one electromechanical transducer may be made up of a stack comprising, for example, several piezoelectric elements mechanically coupled to one another to form the electromechanical transducer. Here, one of the piezoelectric elements of the stack may be mechanically coupled with an actuating membrane which is adapted to excite the tuning fork. The conversion of the electric wave signal into mechanical oscillations may be accomplished by at least one piezoelectric transmit-transducer of said stack serving as an actuator. Similarly, the re-conversion of the mechanical oscillations into an electric wave signal may be accomplished by at least one piezoelectric receive-transducer of said stack forming the electromechanical transducer. Naturally, both piezoelectric transducers, the transmit-transducer serving as an actuator and the receive-transducer, serving as a detector, may be one only common component fulfilling both functions. To increase the electromechanical effect of the piezoelectric elements connected in series, several piezoelectric elements, stacked and mechanically coupled to one another, can be shunted and supplied with an electric wave signal.

As will become apparent to those skilled in the art the inventive diagnostic method is adapted to similarly test both the transmit-transducers and the receive-transducers, since the analyzed transmission characteristics beyond the resonance frequency range of the electromechanical oscillation unit is primarily determined by the ability of the actuation transducer to transform an electrical signal into a mechanical deformation, and the ability of the receive transducer to retransform the mechanical deformation into an electrical signal. Hence, it is possible by the use of the inventive diagnostic method to detect at the same time an erroneous behaviour of the transmit-transducers, of the receive-transducer, of an insufficient mechanical coupling within the stack comprising several piezoelectric elements and of faults in the leads to the transmit and receive-transducer.

In accordance with still a further aspect of the invention, in the analyzing step at least the amplitude of the electric wave signal is compared with a typical value. Naturally, however, additional characteristics as, for example, the phase shift of the electric wave signal may be analyzed and compared with typical values. Besides these values characterizing the electric wave signal, it is possible to additionally record at least one sensor characteristic as, for example, the temperature within the housing for the electronics of the level gauge or other characteristics which are not necessary for the switching function. For example, the temperature in the environment of the electromechanical transducer, the capacities of the actuating- and/or the detection transducer, the impedances of the transducers, the inductivities of the transducers, pressure within the housing, the operating time of the level gauge or the humidity within the vessel or other characteristics which are not needed for the switching functions may be identified.

In accordance with still a further aspect of the invention at least two recorded characteristics, for example, at least two signal characteristics or at least one signal characteristic and one or more sensor characteristics may be combined and processed to form one global diagnostic value which is representative for the qualitative status of the vibrating level gauge. By means of such a combination, it is feasible to derive information about the status of the whole level gauge and not only of the electromechanical oscillation unit. Thereby, actual measured characteristics may be combined with each other or to combine actual measured characteristics with values stored in a memory which will be illustrated below. Furthermore, two values or a plurality of values may be combined with each other, wherein the combination of more than two values may be carried out directly or in several steps by generating several intermediate results. A combination of the identified characteristics may be carried out using mathematical methods. The result is then a new characteristic value. Instead of using mathematical functions it is naturally possible to carry out the combination of the identified characteristics by use of statistical methods, tables, fuzzy-algorithms or neural networks.

As illustrated above, the invention intends to store certain identified characteristics in order to be recalled and used at a later time, whereby the reliability of the self-diagnosis can be improved. For example, typical values may be stored which may be generated during a calibration routine and which may represent the original functionality of the level gauge. On the other hand, extreme values which have been detected during the use of the level gauge may be stored and recalled for being processed at a later time.

Since there is a certain probability that the functionality of the level gauge is affected when one of the identified characteristics and/or the global diagnostic value oversteps a typical value, the individual recorded characteristics and/or the global diagnostic value which was received by means of the above illustrated combination routine shall be checked with respect to such an overstepping, so that a status information representing the actual status of the level gauge may be created and edited. Naturally, it is feasible to recall the individual characteristics or the global diagnostic value via an input-output unit of the vibrating level gauge.

Finally, it should be understood that it is possible to supply the electromechanical transducer of the electromechanical oscillation unit not only with an electric wave signal having only one frequency beyond the frequency range of the electromechanical oscillation unit, but to supply the electromechanical transducer with a plurality of electrical wave signals having different frequencies, respectively, wherein all frequencies are beyond the resonance frequency range of the electromechanical oscillation unit and to process the received signal characteristics of these electric wave signals of different frequencies to form one common signal characteristic being representative for the plurality of electric wave signals. This common signal characteristic value may then be further processed to receive a still more reliable information of the status of the level gauge and in particular of the electromechanical transducer thereof.

BRIEF DESCRIPTION OF THE DRAWINGS

For further explanation and better understanding, several exemplary embodiments of the present invention will be described below in more detail with reference to the attached drawings, of which.

DESCRIPTION OF EXEMPLARY EMBODIMENTS OF THE INVENTION

Figure 1:
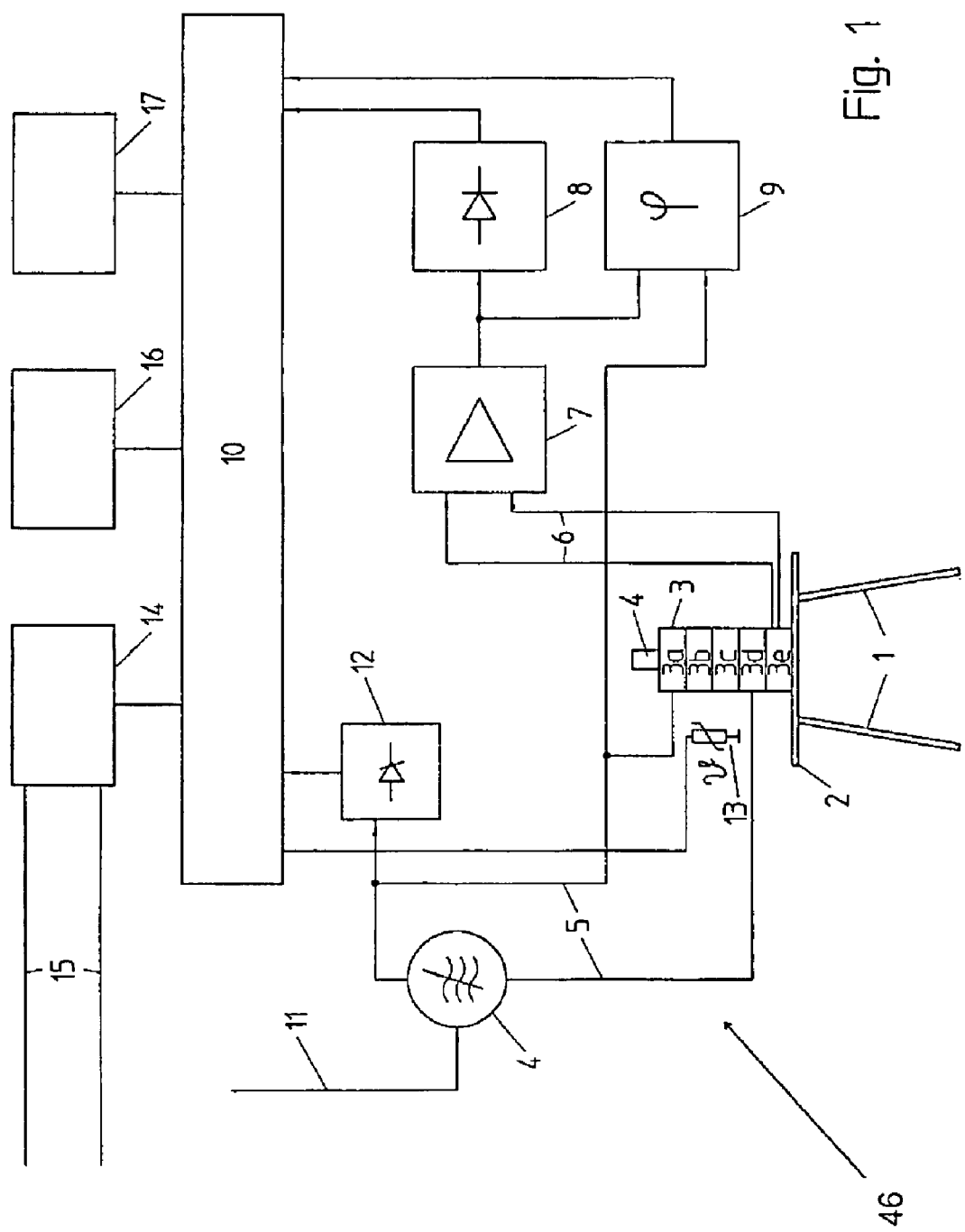
FIG. 1 is a block diagram of a first embodiment of the present invention.

FIG. 1 illustrates a block diagram of a vibrating level gauge as it is, for example, specified in DE 102 03 461. It is illustrated therein that by actuating an oscillatory system in its resonance frequency and by measuring of at least one characteristic value of the system certain predetermined filling levels may be detected.

The oscillatory assembly of FIG. 1 comprises a tuning fork 1 being connected to a membrane 2. A stack 3 comprising a plurality of piezoelectric elements 3a-3e being stacked and mechanically coupled to one another serves as an electromechanical transducer 3. The piezoelectric elements 3a-3e show a centric bore respectively through which a bolt 4 passes through and bears the piezoelectric elements 3a-3e against membrane 2.

The vibrating level gauge 46 comprises an electrical oscillator 4, being variable with respect to its frequency, which generates an electrical wave signal which is transferred via feed cables 5 to the electromechanical transducer 3. The electromechanical transducer 3 comprises a transmit-transducer including shunted piezoelectric elements 3a-3d which cover the electric wave signal into mechanical oscillations, whereby membrane 2 will be actuated. Membrane 2 in turn excites the tuning fork 1. Besides the transmit-transducers 3a-3d the electromechanical transducer 3 comprises furthermore a receive-transducer 3e which reconverts the mechanical oscillations back into an electrical wave signal which is transmitted via feed cables 6 to a receive amplifier 7. Amplifier 7 amplifies said received electric wave signal which is afterwards transferred to rectifier 8 and phase comparator 9. Rectifier 8 generates a signal which is proportional to the amplitude of the amplified electric wave signal, which is then detected by a control unit 10. In contrast thereto, phase comparator 9 generates a signal which is proportional to the phase shift between the electric actuation signal generated by oscillator 4 and the received electric wave signal being received by receive-transducer 3e. This phase proportional signal will also be delivered to control unit 10.

Control unit 10 may, for example, comprise a microcontroller having an appropriate periphery which is adapted to control the measuring process of the vibrating level gauge 46. Control unit 10 is adapted thereto to adjust the frequency of oscillator 4 via control cable 11 and to detect the amplitude of the actuation signal via rectifier 12. Moreover, as illustrated above, control unit 10 is adapted to detect the amplified amplitude of the received electric signal and to analyze the phase shift between the actuating and the received signal. For these purposes, control unit 10 or the microcontroller may include an analogue-to-digital converter.

To detect a predetermined filling level of a product in a vessel control unit 10 varies the frequency of oscillator 4 in a certain range and analyzes the behaviour of amplitude and phase in said frequency range. Thereby, the frequency range is chosen so that it certainly contains the resonance frequency of the oscillation unit comprising tuning fork 1, membrane 2 and the electromechanical transducer 3. The resonance frequency of oscillation unit 1, 2, 3 has to be part of said frequency range, since only the behaviour in the resonance frequency permits to detect a predetermined filling level via comparisons of the resonance frequency, resonance amplitude and/or phase characteristic with a predetermined threshold. However, the behaviour of the oscillatory system in its resonance frequency does not allow detection of the correct functionality of the vibrating level gauge. Therefore, according to the present invention, the transmission characteristics of the electromechanical transducer 3 is analyzed in a frequency range which is far away from the resonance frequency of the electromechanical oscillation unit 1, 2, 3. Thereto, control unit 10 chooses via control cable 11 a frequency of oscillator 4 which is not nearby the resonance frequency of the oscillatory system and thus not adapted to actuate the oscillatory portion 1 of the electromechanical oscillation unit 1, 2, 3 as for example an oscillating rod probe or tuning fork 1. For example, the resonance frequency may be in the range of between 900 and 1100 Hz and the diagnosing frequency may be in the range of between 1500 and 1800 Hz or multiples thereof.

Transmit transducer 3a-3d transforms this diagnosing signal into a mechanical oscillation which is not adapted to actuate membrane 2 or tuning fork 2 to perform oscillations. However, receive-transducer 3e reconverts said deformation back into an electrical wave signal. Consequently, control unit 10 is in the position of being able to analyze the transmission characteristics of the whole electromechanical transducer 3 with respect to amplitude and phase shift in the frequency chosen. When a failure occurs, for example, in the piezoelectric elements 3a-3e in the mechanical coupling between the piezoelectric elements 3a-3e or in feed cables 5, 6, the transmission characteristics of the electromechanical transducer 3 will differ from a before detected typical value of the transmission characteristics in an undisturbed state.

Indeed, the measurement and analysis of the phase shift is adapted to deliver additional information whereby the diagnostic method becomes more reliable. However, it is also possible to make a reliable statement about the functionality of the electromechanical transducer 3 only on the basis of the analysis of the amplitude. As mentioned above, the inventive method for diagnosing does not need to be operated in only one frequency beyond the resonance frequency range of the electromechanical oscillation unit 1, 2, 3. Rather, the inventive method may be operated in a plurality of frequencies, either sequentially or simultaneously, to derive a more reliable result. For example, the results of the analysis of the transmission characteristic in each frequency may be used for averaging to obtain a more exact result. Naturally, the diagnosing frequency may be wobbulated in a certain frequency range which does not comprise any resonance frequencies.

It should be understood that the inventive diagnostic method for checking the functionality of the electromechanical oscillation unit is not limited to the illustrated arrangement having receive and transmit transducers being separated from each other. Rather, the inventive method may also be applied in the event of the electromechanical transducer 3 consisting of at least one piezoelectric element which transmits and receives at the same time.

The vibrating level gauge 46 comprises, furthermore, an input-output unit 14 which is adapted to edit the detected information about the filling level. The input-output unit 14 comprises, for example, an interface which is adapted to read out the detected filling level via a two-wire loop 15 in the form of an impressed current signal in the range of 4 to 20 mA. In addition to the read out of the 4 to 20 mA signal via two-wire loop 15 which supplies the vibrating level gauge 46 with power, a digital signal may be superimposed on the two-wire loop 15 so that digital data may be exchanged with an external location as, for example, a control room. Hence, the two-wire loop 15 permits, besides the provision of filling level information, a possibility to read out diagnostic information as well as a possibility to read in adjusting and calibration values or to input signals to manually trigger the inventive self-test diagnosis.

For purposes of storing certain parameters as, for example, typical values of the transmission characteristic or typical phase shifts, the vibrating level gauge 46 comprises a non-volatile memory 16. As will be illustrated in more detail below, memory 16 is adapted to store typical or extreme parameters of the level gauge for later use.

Finally, level gauge 46 may comprise further components which are adapted to detect additional parameters which may be used for purposes of an improved self-diagnosis. In the illustrated embodiment, the level gauge 46 comprises a temperature sensor 13 which may comprise a temperature-sensitive resistor being arranged near the electromechanical oscillatory element 3. Furthermore, the vibrating level gauge 46 may, for example, comprise a unit 17 which is adapted to detect the operating time of the gauge 46. Said detecting unit 17 may, for example, comprise a real time clock or a timer which is adapted to add up all operating times in which the level gauge 46 was in use.

Figure 2:
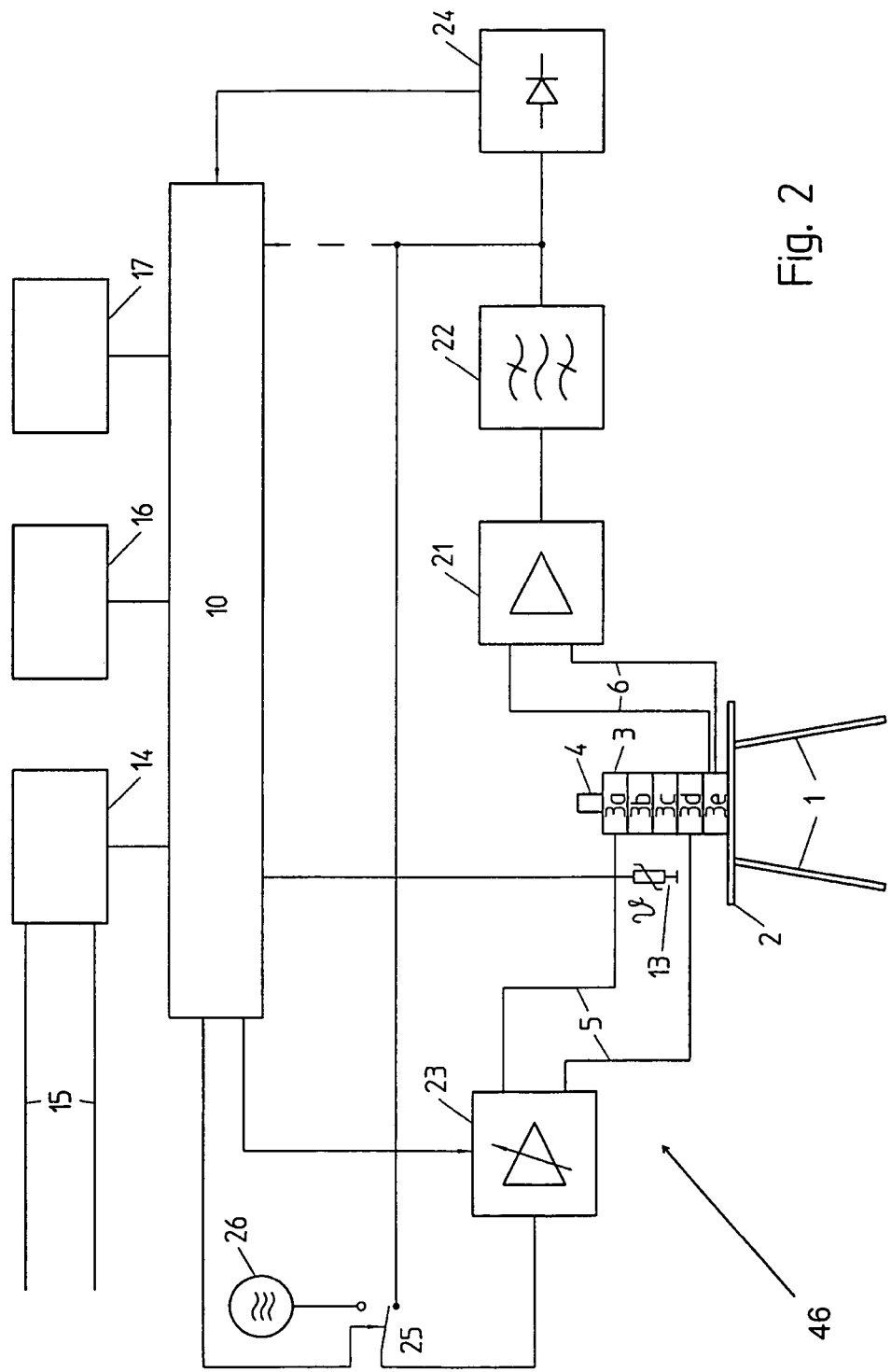
FIG. 2 is a block diagram of a second embodiment of the present invention.

With reference to FIG. 2, a second embodiment of the present invention will be illustrated in which, in contrast to FIG. 1, the electromechanical oscillatory element is integrated in a self-oscillating oscillator. In this embodiment the output signal of the electromechanical transducer 3 is amplified by amplifier 21 and a fundamental wave filter 22 eliminates resonance frequencies of higher frequency. This output signal will be regenerated to final amplifier 23 which feeds the electromechanical elements 3a-3d with said feedback signal. In case of a sufficient loop gain a oscillation will thereby be actuated, the frequency and amplitude of which depend from the characteristics of the electromechanical oscillatory unit comprising tuning fork 1, membrane 2 and transducer 3.

When the filling level of a filling material reaches a certain level so that the tuning fork 1 immerses into said material, the oscillation of said resonant circuit and in particular the amplitude will be attenuated and the resonance frequency will possibly be shifted. Both effects the attenuation and the resonance frequency shift may be used for determination of a predetermined filling level. Therefore, control unit 10 either detects from output signal of filter 22 the frequency of the output signal or determines the amplitude of the output signal which had been rectified at rectifier 24. After a comparison of the detected values with predetermined thresholds the desired switching signal may be derived therefrom and may be edited via input-output unit 14. Thereby, control unit 10 may be designed analogically or digitally using an adequate microcontroller as illustrated with reference to the first embodiment of FIG. 1.

For purposes of the inventive self-test diagnosis, control unit 10 opens the described feedback loop by means of switch 25 so that the self-oscillation terminates. Subsequently, a diagnostic signal will be fed to final amplifier 23 via electrical oscillator 26 and via switch 25. In accordance with the present invention, the diagnostic signal has a frequency which is beyond the resonance frequency range of the oscillatory circuit. (e.g. 900 to 1100 Hz). Said diagnostic signal is then transmitted from final amplifier 23 via transmit transducer 3a-3d, via receive-transducer 3e, via input amplifier 21 and via filter 22 to control unit 10. Hence, as illustrated with reference to the first embodiment of FIG. 1, by detecting the transmission characteristic of said oscillatory circuit, a reliable diagnosis of the functionality of the electromechanical transducer may be effected. In the event that the transmission characteristic is to be detected in more than only one frequency beyond the resonance frequency, the operating frequency of oscillator 26 ought to be suited to be varied by control unit 10. Finally, as illustrated with reference to FIG. 1 the level gauge of FIG. 2 may also comprise additional components as, for example, a temperature sensor 13 or a component 17 for detecting the operation time of the sensor, so that additional parameters may be detected in order to derive therefrom in combination with the detected transmission characteristic a global diagnostic value.

Figure 3:
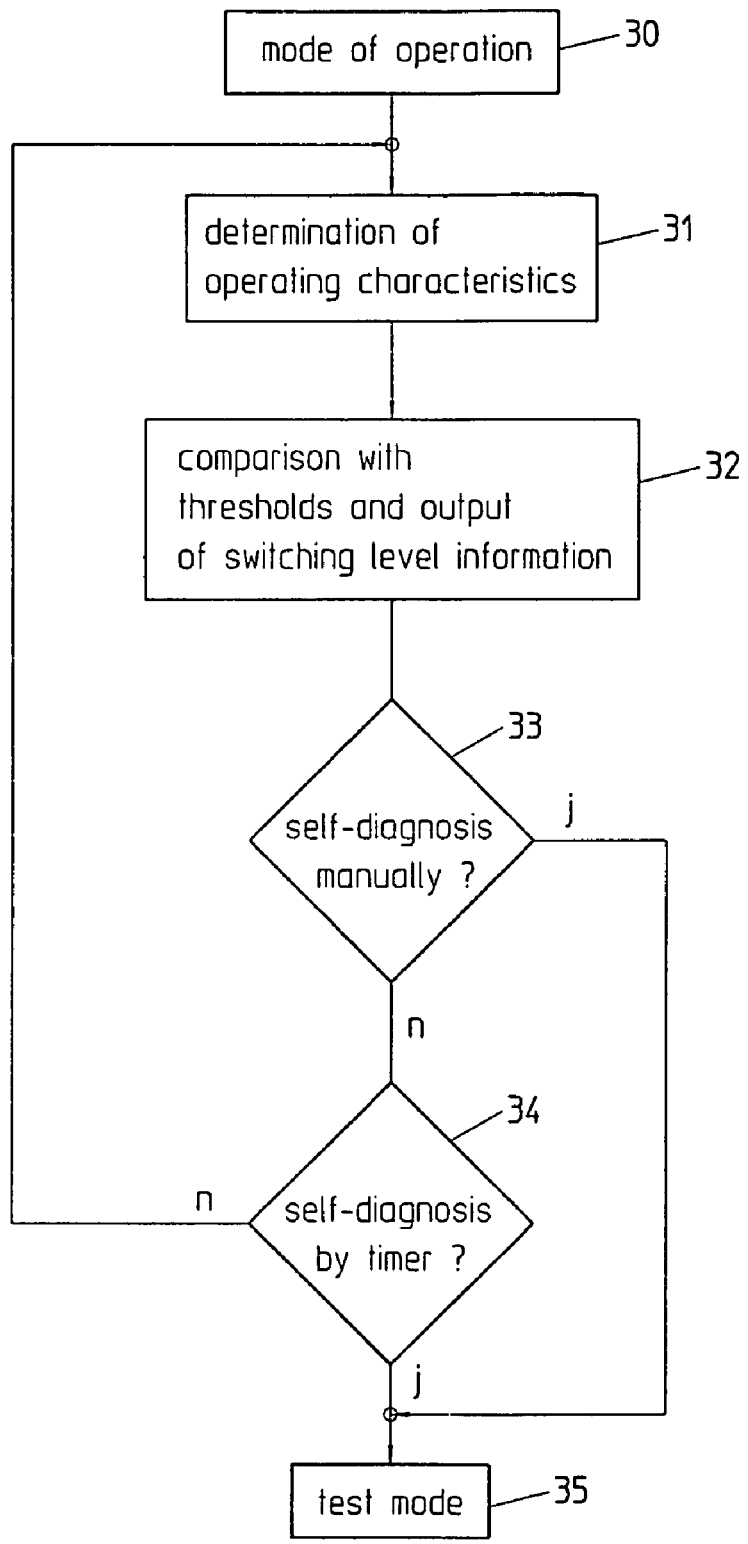
FIG. 3 is a flowchart exemplary illustrating the mode of operation of a vibrating level gauge in the operation mode.

With reference to FIG. 3, a flowchart is shown which illustrates the procedure of the inventive diagnostic method. In this flowchart, block 30 indicates the status of the level gauge in which the gauge performs tasks which are necessary to detect a predetermined filling level. Thereby, control unit 10 detects, in a first step 31, at least one parameter as, for example, the resonance frequency of the oscillatory system and/or the resonance amplitude and/or the phase shift from which an information about the filling level can be derived. In subsequent step 32 the detected parameters will be compared with predetermined thresholds and information about the filling level will be edited on the basis of said comparison. In step 33 or step 34, respectively, will be checked if the inventive self-diagnosis is manually initiated or if a timer indicates that a self-diagnosis should be performed. For example, a timer may initiate the inventive self-diagnosis in certain time intervals. In the event of a self-test the process branches to test mode 35 which is illustrated in more detail with reference to FIG. 4. Otherwise, the operation mode will be initiated again, commencing with a new measurement of the operational parameters.

Figure 4:
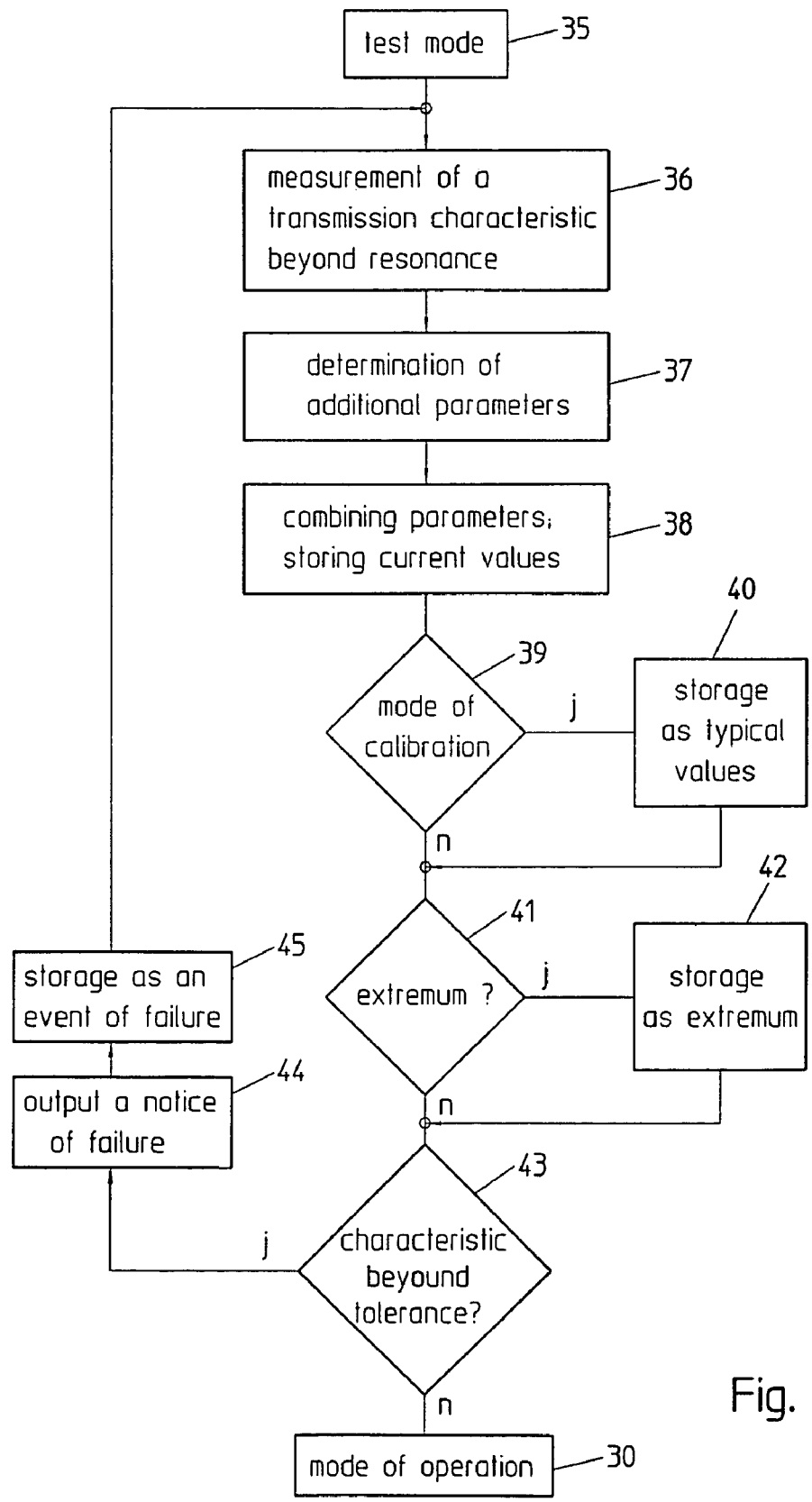
FIG. 4 is a further flowchart exemplary illustrating the mode of operation of a vibrating level gauge in the inventive test mode.

In the following, the process of the test mode 35 will be illustrated with reference to FIG. 4. Test mode 35 commences with a measurement 36 of the transmission characteristic of the electromechanical transducer beyond any resonance. Thereby, at least one amplitude-transmission characteristics A(f1) of at least a frequency f1 will be detected and analyzed. Subsequently, in step 37 additional parameters of the vibrating level gauge as, for example, the current temperature $T_{cur}$ in the environment of the oscillatory element or the current operating time $B_{cur}$ will be determined.

In step 38 the different parameters will be combined and processed to form new diagnostic values. These combinations may be advantageous since some of the detected parameters may interact with each other so that a more reliable status information may be derived when a combination of these parameters is examined. Moreover, it may be advantageous to compare current detected parameters with typical values identified before, in order to detect changes with respect to the functionality of the vibrating level gauge.

The following examples which do not limit the scope of the present invention are intended to illustrate the combination of parameters to form new and more significant values with respect to the functionality of a vibrating level gauge.

As will be known to those skilled in the art, the amplitude transmission characteristic of the electromechanical oscillation unit 1, 2, 3 is normally temperature-sensitive, wherein for purposes of simplification said dependency will be assumed to be linear. Since the current temperature $T_{cur}$ will be detected at the moment of the detection of the amplitude transmission characteristic A(f1), a normalized amplitude transmission characteristic may be derived by means of a simple mathematical operation which normalizes the transmission characteristic A(f1) to a normal temperature $T_n$. Assuming that the temperature dependency is linear, a exemplary equation for calculating a normalized amplitude transmission characteristic $A_n$ may read as follows:

$$A_n = k*(T_{cur} - T_n) + A(f1),$$

wherein k is a proportionality constant expressing the level of the temperature dependency. Subsequently, the normalized amplitude transmission characteristic $A_n$ will be compared with a typical value $A_{typ}$ of the transmission characteristic being fed in during a calibration mode. The difference between said typical value $A_{typ}$ and said current normalized value $A_n$ or the absolute value thereof respectively represents a new diagnostic value $A_d$ which characterizes the functionality of the electromechanical transducer. The more said diagnostic value Ad differs from zero, the more the transmission characteristic has removed itself from its typical value $A_{typ}$.

Naturally, additional combinations and operations may be performed in a subsequent optional step to obtain a still more reliable and better interpretable status information D. For example, the current operating time B, the maximum temperature ever occurred and the transmission characteristic $A_d$ may be combined by being multiplied with a corresponding proportionality constant $k_i$, respectively, as follows:

$$D = k_1*B_{cur} + k_2*T_{max} + k_3*A_d,$$

wherein $$A_d = |A_n - A_{typ}|,$$

and
D=global diagnostic value
$B_{cur}$=current operating time
$T_{max}$=maximum temperature
ki=proportionality constants with i=1 . . . n By means of statistically derived experience values a status message information may be derived from said numerical global diagnostic value D by comparison, wherein said status message information describes the total status of the vibrating level gauge. For example, these messages could read as follow: "Gauge as good as new", "low ageing present", "advanced ageing, replace at the next opportunity", or "still functioning, but urgently to be replaced".

The above illustrated mathematical equations are just exemplary, so that instead of these functions more complex operations as, for example, fuzzy algorithms, statistical methods, tables or neural networks may be applied.

Moreover, it is appreciated to store the determined values and parameters in a memory to be recallable without the need for an execution of a self-diagnosis.

In the further course of the inventive process it may be checked in block 39 whether the test mode was initiated in the course of a calibration process or not. Generally, such a calibration process will only be initiated during the manufacturing of an inventive level gauge. However, the calibrating process 39 may naturally also be manually initiated to adjust the vibrating level gauge during normal use. In the event that a calibration process 39 has been initiated, the detected values and parameters may be stored as typical values in a memory (block 40). Subsequently, the currently detected parameters will be compared with stored extreme values in a further enquiry 41. In the event that a current parameter oversteps a prior extremum, the prior extremum will be replaced by said current parameter. For example, it may be appreciated to replace a stored maximum or minimum temperature value in the environment of the oscillatory element by a current value when said current value oversteps these extreme temperature values. In the case that the diagnostic value $A_d$ is, for example, beyond a predetermined threshold, the electromechanical transducer is definitely out of order so that in block 44 a notice of failure will be edited. It is appreciated to store such an event of failure in block 45 together with date and time in case that a real time clock is provided. Subsequently, the test mode will be traversed again. In the event that no failure exists, control unit 10 will return to the operation mode after the test mode has been completed.

Finally, it should be recognized that most of the inventive aspects of the diagnostic method may be transferred to other level gauges as, for example, continuously measuring level gauges. In particular, the measuring of parameters which are not necessary for the measuring function but which provide useful information for the inventive self-diagnosis, the storage of typical and extreme parameters and the combination and processing of parameters for generating a more reliable diagnostic value is apparently applicable to other level gauges as, for example, continuously measuring level gauges.

The invention claimed is:

1. A method for diagnosing a functionality of an electromechanical oscillation unit of a vibrating level gauge, comprising the steps of:
    supplying at least one electromechanical transducer of the electromechanical oscillation unit with an electric wave signal, a frequency of which is beyond a resonance frequency range of the electromechanical oscillation unit and is not adapted to cause resonance of an oscillatory portion of the electromechanical oscillation unit so that the electric wave signal is converted into mechanical oscillations;
    recording the converted mechanical oscillations using the at least one electromechanical transducer of the electromechanical oscillation unit, which reconverts the mechanical oscillations into the electric wave signal;
    analyzing transmission characteristics of the electromechanical transducer by comparing at least one of signal characteristics of the reconverted electric wave signal with predetermined signal characteristics; and
    adjusting a status information subject to an analysis of the transmission characteristics.

2. The diagnostic method according to claim 1, wherein a plurality of shunted electromechanical transducers are supplied with an electric wave signal.

3. The diagnostic method according to claim 1, wherein diagnosis is continuously performed during an operation of the vibrating level gauge.

4. The diagnostic method according to claim 1,
wherein diagnosis is performed after initiating a testing interval.

5. The diagnostic method according to claim 1,
wherein the analysis of the reconverted electric wave signal is accomplished by a control unit of the vibrating level gauge.

6. The diagnostic method according to claim 5,
wherein the analysis of the transmission characteristics is performed by (i) supplying the electromechanical transducer of the electromechanical oscillation unit with a plurality of electric wave signals having different frequencies respectively, all of which are beyond the resonance frequency range of the electromechanical oscillation unit and are not adapted to excite the oscillatory portion of the electromechanical oscillation unit, and (ii) processing the received signal characteristics of these electric wave signals to form one common signal characteristic being representative for the plurality of electric wave signals.

7. The diagnostic method according to claim 1,
wherein, in the analyzing step, at least an amplitude of the electric wave signal is compared with a predetermined value.

8. The diagnostic method according to claim 7,
wherein, in the analyzing step, a phase shift of the electric wave signal is compared with a further predetermined value.

9. The diagnostic method according to claim 1,
wherein the conversion of the electric wave signal into mechanical oscillations is accomplished using at least one piezoelectric transmit-transducer of the electromechanical transducer.

10. The diagnostic method according to claim 9,
wherein the reconversion of the mechanical oscillations into the electric wave signal is accomplished using at least one piezoelectric receive-transducer of the electromechanical transducer.

11. The diagnostic method according to claim 10,
wherein the piezoelectric transmit-transducer and the piezoelectric receive-transducer are stacked and mechanically coupled to one another to form the electromechanical transducer.

12. The diagnostic method according to claim 10,
wherein the piezoelectric transmit-transducer and the piezoelectric receive-transducer are one common component.

13. The diagnostic method according to claim 1,
wherein at least one sensor characteristic of the vibrating level gauge is recorded, which is not necessary for the switching function.

14. The diagnostic method according to claim 13,
wherein at least one type of the recorded characteristics is stored.

15. The diagnostic method according to claim 13,
wherein at least one of (i) the recorded characteristics and (ii) the global diagnostic value is analyzed with respect to overstepping of predetermined thresholds.

16. The diagnostic method according to claim 13,
wherein at least the signal characteristics of at least one of (i) the reconverted electric wave signals and (ii) the global diagnostic value are digitally read out via a two-wire loop.

17. The diagnostic method according to claim 13,
wherein at least one of (i) extreme signal and (ii) sensor characteristics and the predetermined values are stored in a non-volatile memory.

18. The diagnostic method according to claim 13,
wherein the at least one sensor characteristic is a characteristic of a group of sensor characteristics consisting of temperature, capacity, impedance, inductance, pressure, operating time and humidity.

19. The diagnostic method according to claim 18,
wherein at least one recorded signal characteristic and at least one sensor characteristic are combined and processed to form one global diagnostic value, which is representative of a qualitative status of the vibrating level gauge.

20. The diagnostic method according to claim 19,
wherein the at least one recorded signal characteristic and the at least one sensor characteristic are processed to derive one global diagnostic value using at least one processing arrangement of a group of processing arrangements consisting of mathematical methods, statistical methods, tables, Fuzzy-algorithms and neural networks.

21. A self-diagnosing vibrating level gauge comprising:
an electromechanical oscillation unit having an oscillatory portion and a first transducer receiving a first electric wave signal having a frequency beyond a resonance frequency range of the electromechanical oscillation unit, the first transducer converting the electric wave signal into mechanical oscillations, wherein the first transducer is one of an electromechanical transmit transducer and an electromechanical transmit-receive-transducer;

a second transducer reconverting the mechanical oscillations into a second electric wave signal, the second transducer being one of a receive-transducer and a transmit-receive-transducer; and a control unit analyzing transmission characteristics of the first transducer by comparing at least one characteristic of the second electric wave signal to predetermined typical characteristics.

* * * * *